United States Patent
Wilke

[11] Patent Number: 5,803,211
[45] Date of Patent: Sep. 8, 1998

[54] MOTORIZED BRAKE ACTUATOR, ESPECIALLY FOR RAIL VEHICLES

[76] Inventor: Richard Wilke, Am Weissenfeld 4, D-58332 Schwelm, Germany

[21] Appl. No.: 791,892

[22] Filed: Jan. 31, 1997

[30] Foreign Application Priority Data

Jan. 31, 1996 [DE] Germany .................. 196 03 193.1

[51] Int. Cl.⁶ .................................................. B60T 13/04
[52] U.S. Cl. ........................................ 188/173; 188/180
[58] Field of Search ........................ 188/156, 158–165, 188/171, 173, 180, 1.11; 192/90, 111 A, 120; 303/20; 318/362, 364, 372

[56] References Cited

U.S. PATENT DOCUMENTS

| | | | |
|---|---|---|---|
| 4,327,414 | 4/1982 | Klein | 364/426 |
| 4,557,355 | 12/1985 | Wilke. | |
| 4,658,939 | 4/1987 | Kircher | 188/156 |
| 4,805,740 | 2/1989 | Wilke. | |
| 5,620,077 | 4/1997 | Richard | 192/120 |

*Primary Examiner*—Robert J. Oberleitner
*Assistant Examiner*—C. T. Bartz
*Attorney, Agent, or Firm*—Herbert Dubno

[57] ABSTRACT

A brake system for gradual, uniform and jerk-free deceleration of a load, such as a railway car, can have a motor which is operable to store force in a spring and which force is applied in a force-transmitting chain including a measuring spring to a brake element. The displacement of the measuring spring is translated into a displacement of the wiper of a variable resistor connected in a common adjustable branch of a Wheatstone bridge with a setpoint resistor and with an inverse characteristic resistor. The two latter resistors have pairs of terminals to which control currents are applied and a switch is provided to alternatively shunt one or the other of the two pairs of terminals.

6 Claims, 1 Drawing Sheet

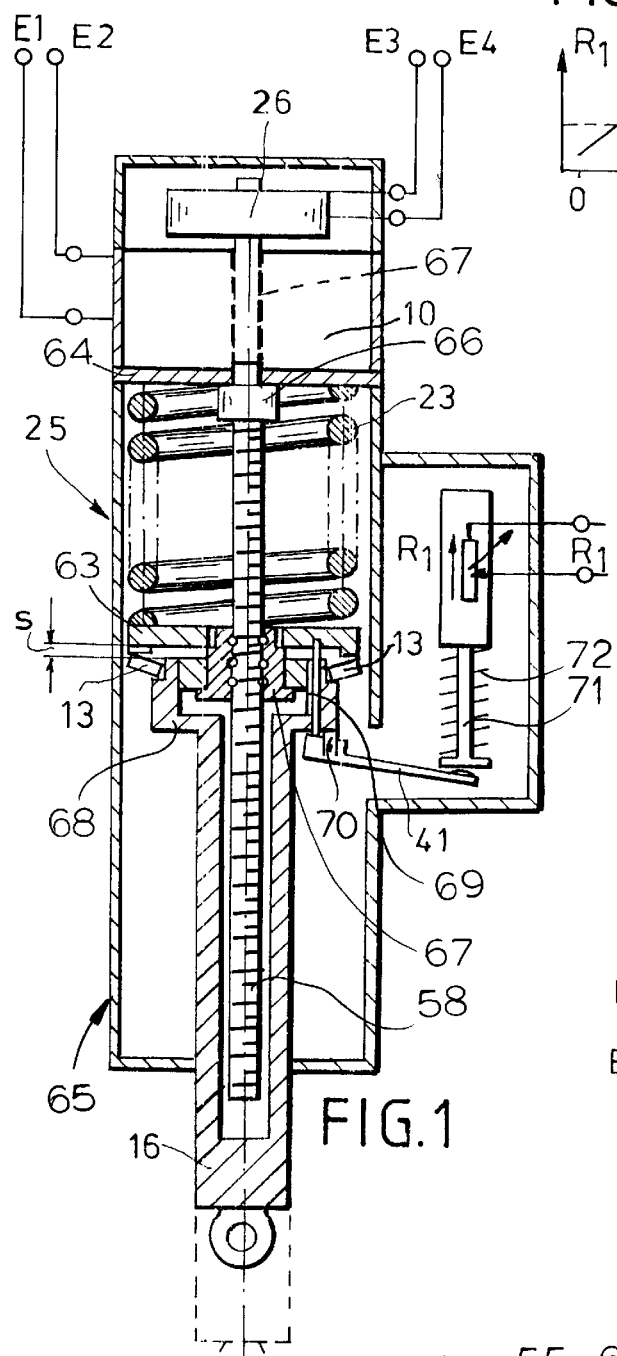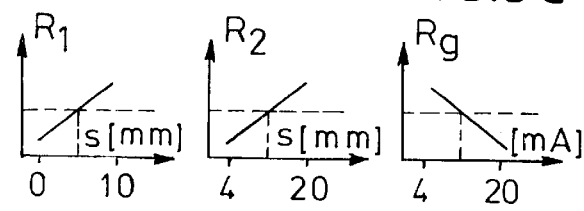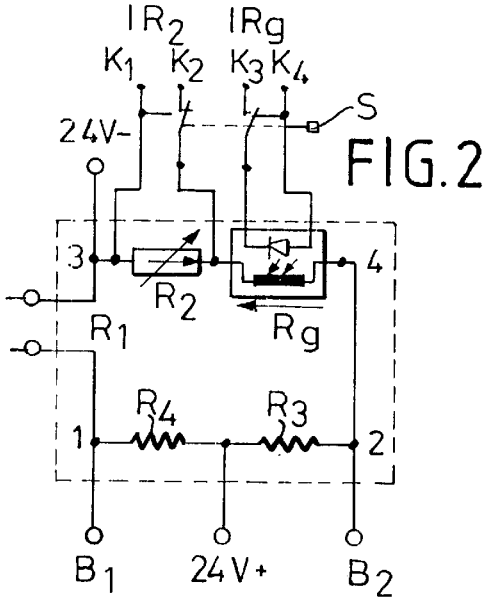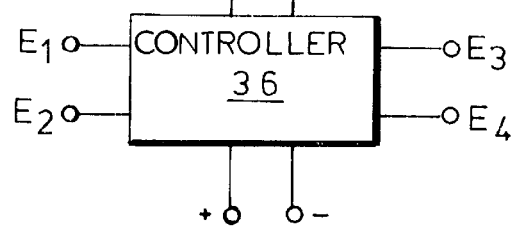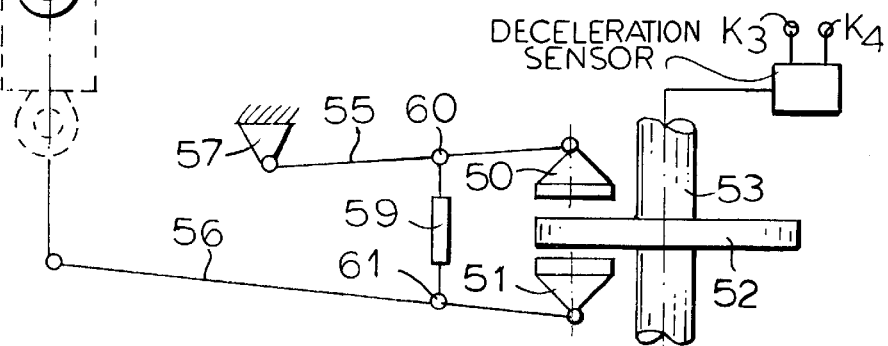

5,803,211

MOTORIZED BRAKE ACTUATOR, ESPECIALLY FOR RAIL VEHICLES

FIELD OF THE INVENTION

The present invention relates to a motorized brake actuator, especially an electric motor operated brake actuator, which can be used most advantageously for railway brakes. In particular, this invention relates to a railway brake of the type in which a shaft of a railway car, e.g. an axle, can have a brake disk engageable by brake shoes utilizing an actuator with a force-storing spring in which the stored force applies the brake and a motor serves to stress the force-storing spring and release the brake. Such a system can have an electrical resistor whose resistance varies as a function of the stress on a spring in the braking force application path.

BACKGROUND OF THE INVENTION

Electrically-controllable brake actuating systems utilizing a force-storage spring can be utilized for short-haul rail travel for the braking of a rail vehicle. Reference may be had to German patent document 40 35 045 and U.S. Pat. No. 4,805,740 in that regard. Force-storage springs operating brakes are also described in the German journal "Stadtverkehr", volume 40, No. 7, page 15 (1995). Among the significant components of a force-storing brake utilizing a force-storage spring as described, for example, in DE 4,035,045 (see also U.S. Pat. No. 4,805,740), is a spring system which is represented at 13 in FIG. 1 and which, over its spring displacement, produces a proportional change in an ohmic resistance representing the brake force and applied as an actual value of the brake force in a Wheatstone bridge circuit element 90b in FIG. 1 of U.S. Pat. No. 4,805,740).

The force-measuring device of DE 4,035,045 C2 enables a precise setting and control of the brake force and fulfills the requirements of the German Association of Railroads (VÖV) and particular the regulations VÖV 6.325.1-4.1.6 and 6.030.1-19.4 which are designed to ensure a deceleration of the rail traveler by a comfortable braking of the rail carriage, i.e. braking free from jerks and jolts.

To achieve a uniform deceleration upon the braking of the rail vehicle, the requisite brake force in the past had to be determined for the particular braking requirement. This previously calculated brake force for all possible carriage loads and the wide range of rises and dips in the track stretch was inputted into a control program of a computer or controller for which the Wheatstone bridge provided an input.

The brake commands inputted by this controller or program were supplied as setpoint values in the Wheatstone bridge so that the braking pressure or force is generated to zero the potential across the bridge.

A problem with this system of course is that the calculated and predetermined brake value might not at all times correspond to the required brake value for the instantaneous or current conditions along the track. For example, temperature differences, differences in humidity or surface characteristics of the rails, frost and the like may make the calculated or predicted values too high or too low so that uniform deceleration of the rail vehicle was disturbed.

U.S. Pat. No. 4,557,355 describes a device for controlling an electromechanical brake in rail vehicles for passenger cars in which the speed of the braked drive shaft of the passenger is monitored by means of a tachometer 24 which applies a signal through a differentiator (referred to as an accelerometer) 18 and via a ROM processor 29 to the input of a comparator for comparison with a setpoint speed to result in smooth braking, i.e. braking free from jerks or jolts, to standstill.

OBJECTS OF THE INVENTION

It is, therefore, the principal object of the present invention to provide an apparatus in the nature of a brake actuator and especially a brake actuator operated by an electric motor, especially for a rail vehicle which has simple means for assuring uniform deceleration of the vehicle and hence has greater reliability than earlier systems.

Another object of the invention is to provide a relatively simple and reliable brake actuator for a railway brake which enables jerk-free deceleration to standstill but which does not require significant modification of basic elements of the brake system or the railway drive and control apparatus.

SUMMARY OF THE INVENTION

The invention makes use of a motor-operated railway brake utilizing a force-storage spring as has been described in connection with German patent document 4 035 045 C2 and U.S. Pat. No. 4,805,740, for example, but provides the variable resistor whose resistance value represents the braking force, in series with a controllable setpoint resistor and a controllable resistor whose ohmic value is a function of an electrical input and which has a mean value at the same level as the setpoint resistance (and preferably also at the same level as the mean value of the variable resistance) but an inverse resistance characteristic in the variable branch of the Wheatstone bridge, the electrical input terminals of this resistor with inverse resistance characteristic and the input terminals of the setpoint resistor being alternately open-circuited or short-circuited, i.e. the setpoint resistor and the terminals of the inverse resistance element can be selectively short circuited to take the setpoint resistor or the control input for the inverse resistance selectively out of the bridge circuit while leaving the other in circuit.

More particularly, the brake-operating system of this invention can comprise:

a brake element having an actuated state in which the brake device is engaged and a deactuated state in which the brake device is disengaged;

a brake drive motor having an output member operatively connected to the brake element;

a force-storing spring operatively connected to the output member and having a stressed state corresponding to the deactuated state of the brake element and a relieved state corresponding to an actuated state of the brake element;

an actuator between the force-storing spring and the brake element and transferring force from the force-storing spring to the brake element, the actuator being movable through a given spring displacement relative to the force-storing spring;

a bridging spring interposed between the force-storing spring and the actuator and enabling the displacement; and a Wheatstone bridge comprising:
  a variable resistor having a resistance varying with the displacement and a controllable setpoint resistor in series with the variable resistor and forming therewith one arm of the Wheatstone bridge,
  an electrically modifiable resistor having a mean resistance equal substantially to a mean resistance of the setpoint resistor forming another arm of the bridge and having a first pair of terminals across which a potential is applicable for varying a resistance of the electrically modifiable resistor with an inverse current/resistance characteristic, the variable resistor, the controllable setpoint resistor and the electrically modifiable resistor forming a variable branch of the bridge, a second pair of terminals connected across the controllable setpoint resistor, and means for alternately and selectively short circuiting and open circuiting the terminals of the first and second pairs.

The brake elements can engage a disk on a shaft of a railway car.

Advances in sensor technology have led to the development of accelerometers and decelerometers which have been found to be particularly advantageous in aircraft and can have output signals which are analog values providing a measure of deceleration in units of mA/g.

According to the invention, a decelerometer is provided on the railway vehicle having an analog 4 to 20 mA/g output which is connected across the first pair of terminals and which allows monitoring of the programmed and/or manually-controlled brake pressure.

BRIEF DESCRIPTION OF THE DRAWING

The above and other objects, features, and advantages will become more readily apparent from the following description, reference being made to the accompanying drawing in which:

FIG. 1 is a cross section of the mechanical parts of a brake-actuating device with a variable resistor $R_1$, allegedly as described at column 3, lines 58–68 and column 4, lines 1–49 and element 90b of German patent document 40 35 045 C2 and, of course, as described in principle in U.S. Pat. No. 4,805,740, but with a modified connection between the stored-force actuating unit and the resistor;

FIG. 2 is a diagram of the Wheatstone bridge in which the resistor $R_1$ of FIG. 1 is connected as a resistance across corresponding terminals in the bridge of FIG. 2;

FIGS. 3A, 3B and 3C are respective characteristic curves of the variable resistor $R_1$, the controllable setpoint resistor $R_2$ and electrically modifiable resister $R_g$; and FIG. 4 is a diagram of the connections to the control circuit or programmable unit corresponding to the unit 36 of DE 40 35 045 C2 or of U.S. Pat. No. 4,805,740.

SPECIFIC DESCRIPTION

The brake device (FIG. 1) for a railway vehicle according to the invention can comprise a pair of brake shoes 50, 51, juxtaposed with a brake disk 52 and engageable therewith in an actuated state of the brake. The brake disk 52 is, in turn, carried by a shaft or axle 53 of the vehicle which is provided with an analog deceleration sensor 54 (such as an accelerometer) outputting a potential or current IR to the terminals $K_3$ and $K_4$ to be described in greater detail with reference to FIG. 2.

The brake shoes 50 and 51 are articulated to levers 55 and 56, on which the lever 55 is pivotally connected to the chassis of the railway vehicle as represented at 57 while lever 56 is pivotally connected to an actuator 16 in the form of a tubular rod coaxial with and receiving a threaded spindle 58 forming the output element of an electric motor 10. A link 59 is pivotally connected to the lever 55 at 60 and to the lever 56 at 61.

Thus, the movement of rod 16 downwardly into the broken-line position shown in FIG. 1 will swing the lever 56 in the counterclockwise sense about the pivot 61 and draw the link 59 downwardly to press the brake shoes 50 and 51 against the opposite faces of the brake disk 52 and brake rotation of the shaft 53 and travel of the vehicle. Conversely, an upward movement of the rod 16, into the solid-line position shown, will swing the lever 56 in the clockwise sense about the pivot 61 and urge the link 59 upwardly to swing the brake shoes 50 and 51 into the disengaged positions shown.

The threaded spindle 58, driven by the motor 10, cooperates with a circulating-ball nut 62 to raise or lower a seat 63 of the force-storing spring 25. The coil-compression spring member 23 of the force-storing spring 25 is braced against this seat 63 and against a wall 64 of a housing 65 receiving the motor 10, the spindle 58 and the upper portion of the tubular rod 16. A bearing 66 journals the spindle 58 rotatable, while preventing its axial displacement.

Within the housing 65, above the electric motor 10, the shaft 67 of the spindle is provided with an electrically operated holding brake 26 which, when energized through the terminals E3 and E4, prevents rotation of the shaft 67 and hence of the spindle 58.

The nut 62 acts upon the seat 63 to compress the spring 23 when the spindle 58 is rotated in one sense (deactuation and disengagement of the brake) by drawing the rod 58 upwardly. Upon rotation of the spindle in the opposite sense, the spring 23 expands and drives the rod 58 downwardly. The head 68 of rod 58 can move relative to the seat 63 by a total displacement s and the space between them is spanned by a bridge spring 13 in the form of a spring washer (belleville dished-disk spring).

The relative displacement s is applied to the wiper of a variable resistor $R_1$ through a motion multiplier formed by a pin 69 connected to the plate 63 and sliding in the head 68, and a lever 41 fulcrummed at 70 to the rod 58 and articulated to the pin 69. The lever 41 acts upon the slider or wiper 71 of the resistor $R_1$, which is held by a spring 72 against the lever 41.

FIG. 4 shows the circuit 36, which can correspond to that of German patent document DE 40 35 045 C2 or U.S. Pat. No. 4,805,740, wherein the terminals $E_1$ and $E_2$ are connected to the corresponding input terminals of the drive motor 10 serving to compress the spring 23 and thus store force in the force-storing spring for application to the rod 16 and hence to the brake elements 50, 51, when that motor causes the spindle 58 to rotate in the opposite direction. The terminals $E_3$ and $E_4$, of the circuit 36 of FIG. 4 are connected to the correspondingly-marked terminals of the holding brake 26 which immobilizes the shaft 67 and the spindle 58 when the brake 26 is energized.

The terminals + and − connected to a direct-current source and the terminals $B_1$ and $B_2$ are connected to the correspondingly-marked terminals for the Wheatstone bridge of FIG. 2. The voltage source there is represented at +24V and −24V.

The Wheatstone bridge shown in FIG. 2 has a controlled branch which includes the variable resistor $R_1$, a setpoint resistor $R_2$ with terminals $K_1$, $K_2$, corresponding to the second pair of terminals previously described, and the inverse-characteristic resistor $R_g$ with its terminals $K_3$, $K_4$ corresponding to the first pair of terminals.

The fixed resistance branch of the bridge is formed by the resistors $R_3$ and $R_4$.

FIG. 3A shows how the resistance of the resistor $R_1$, plotted along the ordinate, varies with the displacement s plotted along the abscissa. This displacement is transmitted to the variable resistor $R_1$ via the lever 41 and represents the force developed by the measuring spring 13. If the measuring spring 13 is compressed, the resistance value of resistor $R_1$ will be greater and the resistance value is reduced when the measuring spring 13 expands.

FIG. 3B shows a corresponding resistance characteristic for the setpoint resistor $R_2$.

FIG. 3C shows the inverse characteristic of the resistor $R_g$ which is a field-effect transistor (FET) provided with an optical coupler of the type H11F (see also FIG. 4 of U.S. Pat. No. 4,805,740). The FET $R_g$ thus forms an inverse resistor to the terminals of which a 4 to 20 mA/g analog signal $Ir_g$ is applied from the deceleration sensor 54. The resistors $R_1$, $R_2$ and $R_g$ all have the same mean resistance.

The Wheatstone bridge circuit also includes a switch S selectively bridging the terminals $K_3$ and $K_4$, and the terminals $K_1$, $K_2$.

In one position of the switch S, contacts $K_1$ and $K_2$ are connected together to short circuit the setpoint resistor $R_2$ while the terminals $K_3$ and $K_4$ are not shorted and the feedback signal from the deceleration sensor 54 is applied across terminals $K_3$ and $K_4$ to the photocoupler of the FET forming the inverse resistor $R_g$.

To commence a normal braking operation, in accordance with VÖV 6.325.1, the actuating lever of the brake, upon being swung about 10° from the drive direction and prior to a stopping point of the rail vehicle, actuates the switch S to bridge the terminals $K_3$, $K_4$ (position shown in FIG. 2) until the normal brake pressure is attained, inducing a normal deceleration in stepless braking of about 1.3 g corresponding to an FET current of 10 mA (FIG. 3C). The FET resistor Rg can then assume the function of the resistor $R_2$ which has been set at the normal brake pressure and can be short-circuited.

If, for example, the deceleration after commencement of the braking process then increases, the control current $IR_g$ generated is applied to the terminals $K_3$, $K_4$ by the decelerometer 54 to control the FET which is no longer short-circuited to induce a reduction in the voltage drop across the FET $R_g$. (FIG. 3C), the bridge voltage across the terminals 3, 4 of the bridge then goes negative and the holding brake 26 via the terminals $E_3$, $E_4$ is opened. Voltage is applied to the terminals $E_1$, $E_2$ to drive the spindle 58 to reduce the spring pressure applied by the storage spring 23. When this spring pressure is reduced to the pressure represented by the resistance of the FET, this control stage is ended.

Conversely, when the deceleration drops, the current $Ir_g$ drops at the FET. The bridge voltage 3-4 goes positive and the holding brake 26 is opened by the voltage at terminals $E_3$, $E_4$ so that the spring force and thus the brake forces increase until the equilibrium in the Wheatstone bridge is restored.

The resistor $R_2$ establishes a setpoint which can be varied by the voltage across the terminals $K_1$, $K_2$ and where possible the resistance value $R_2=R_g$. The control current at the terminals $K_3$, $K_4$ should be selected, if the desired deceleration corresponding to the brake force represented by the resistance value of resistor $R_2$ is to be achieved to maintain this deceleration.

It can be easily seen that the deceleration can be altered and even programmed by varying the resistor $R_2$ through the FET by a current in mA equal to the $R_g$ value.

Since the braking effects deceleration of the carriage with the desired jerk-free uniformity to standstill, the system is simpler and more reliable than earlier arrangements. It is no longer necessary to program the apparatus for the carriage weight and other factors which have hitherto had to be taken individually into consideration, like the angle of rise, angle of descent, etc. The predetermined uniform deceleration can also ensure that skidding because of over-braking can no longer occur, i.e. the apparatus functions as an anti-blocking system (i.e. an ABS braking system). It is only necessary to monitor the wheels of the vehicle from time to time as to the condition of the bearings so that skidding because of damaged bearings will no longer occur.

If during the uniform braking, because of a problem along the track stretch, an increase in the braking is desired, the operator can, as before, swing the brake lever from the 10° position opposite the travel direction to a 40° or 45° emergency brake position. In that case, the Wheatstone bridge as has been shown in FIG. 2 can have its FET $R_g$ short-circuited and replaced by the resistance of resistor $R_2$ so that the normal carriage control becomes fully effective once again. Once the problem is passed, the brake lever can be swung into its 10° position and the jerk-free deceleration continued to standstill.

The transition from motor braking to the stored-force braking with the invention also is both jerk-free and free from problems.

In summary, the arrangement of the invention has the following advantages:

The described device can be controlled with acceleration value without alteration.

By providing an FET (field-effect transistor) with an optocoupler of the type H11F at Rg in series with the setpoint bridge resistor $R_2$ in branch 3-4 of the Wheatstone bridge as shown in FIG. 2, an additional safety factor is introduced.

Since control of the brake force only requires a limited current change in the resistor $R_g$ of about 8 mA, the resistance change in the FET of $R_g$ is substantially linear (see FIG. 3C) and usually is temperature-independent.

The braking system of the invention can also be used for uniform deceleration in hoists, escalators, cable-car systems and the like, requiring only an emergency brake button for currentless release of the holding brake via the terminals $E_3$, $E_4$.

A further use of the electric brake device of FIG. 1 is in the press field where the operation must be precise and reproducible. In that case it is only necessary to replace the H11F FET in the Wheatstone bridge by a linear optocoupler JL 300 to compensate for time and temperature-dependent nonlinearities. In this application, the stroke until the force application can be optionally long.

Instead of the electric motor 10 with its holding brake 26, including its spindle and nut-drive, motors of other types can be employed, including fluid-operated units like pneumatic or hydraulic cylinders.

I claim:
1. A motorized brake device comprising:
a brake element having an actuated state in which said brake device is engaged and a deactuated state in which said brake device is disengaged;
a brake drive motor having an output member operatively connected to said brake element;
a force-storing spring operatively connected to said output member and having a stressed state corresponding to said deactuated state of said brake element and a relieved state corresponding to an actuated state of said brake element;

an actuator between said force-storing spring and said brake element and transferring force from said force-storing spring to said brake element, said actuator being movable through a given spring displacement relative to said force-storing spring;

a bridging spring interposed between said force-storing spring and said actuator and enabling said displacement; and a Wheatstone bridge comprising:
- a variable resistor having a resistance varying with said displacement and a controllable setpoint resistor in series with said variable resistor and forming therewith one arm of said Wheatstone bridge,
- an electrically modifiable resistor having a mean resistance equal substantially to a mean resistance of said setpoint resistor forming another arm of said bridge and having a first pair of terminals across which a potential is applicable for varying a resistance of said electrically modifiable resistor with an inverse current/resistance characteristic, said variable resistor, said controllable setpoint resistor and said electrically modifiable resistor forming a variable branch of said bridge,
- a second pair of terminals connected across the controllable setpoint resistor, and
- means for selectively short circuiting and open circuiting the terminals of said first and second pairs.

2. The motorized brake device defined in claim 1 wherein said electrically modifiable resistor with an inverse current/resistance characteristic is comprised of a field-effect transistor.

3. The motorized brake device defined in claim 2 wherein said field-effect transistor comprises a linear optocoupler for generating a precisely linearly variable pressure for measurement purposes.

4. The motorized brake device defined in claim 3, further comprising a member braked upon actuation of said brake element and a decelerometer mechanically connected to said member and producing an analog output representing deceleration of said member, said decelerometer having a 4 to 20 mA/g signal output applied across said first pair of terminals.

5. The motorized brake device defined in claim 1 wherein said brake drive motor is an electric motor.

6. The motorized brake device defined in claim 5, further comprising a member braked upon actuation of said brake element and a decelerometer mechanically connected to said member and producing an analog output representing deceleration of said member, said decelerometer having a 4 to 20 mA/g signal output applied across said first pair of terminals.

* * * * *